July 26, 1938. H. K. PETER 2,124,708
DRIVING DEVICE PROVIDED WITH ENDLESS TRACK CHAINS FOR MOTOR VEHICLES
Filed March 4, 1935 2 Sheets-Sheet 1
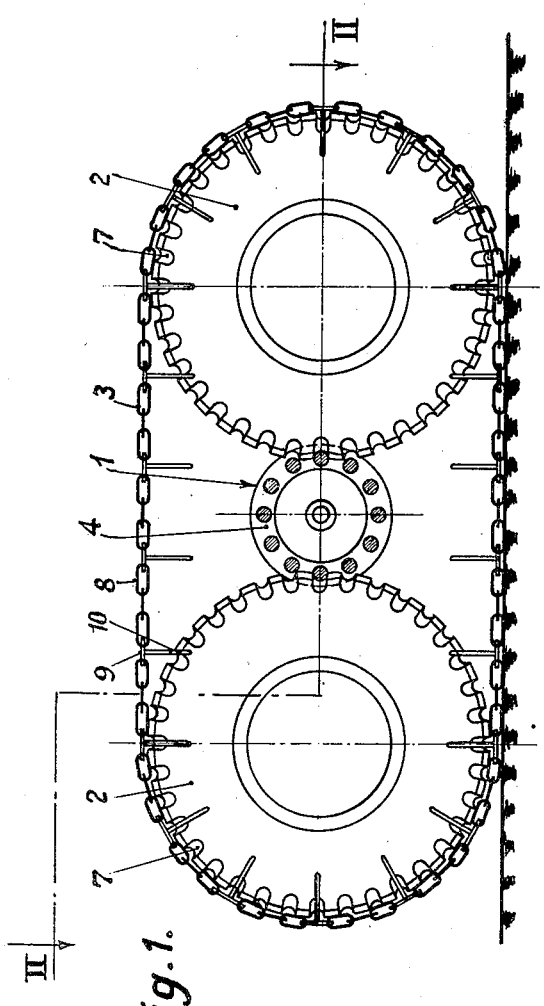
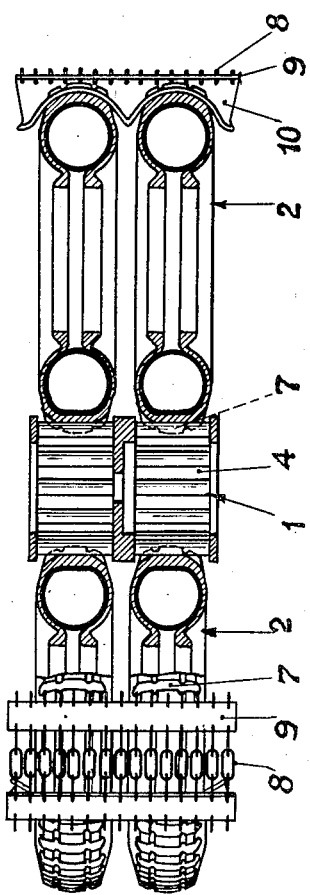
Inventor:
Hans Konrad Peter
by S. Sonal,
Attorney July 26, 1938.  H. K. PETER  2,124,708
DRIVING DEVICE PROVIDED WITH ENDLESS TRACK CHAINS FOR MOTOR VEHICLES
Filed March 4, 1935    2 Sheets-Sheet 2
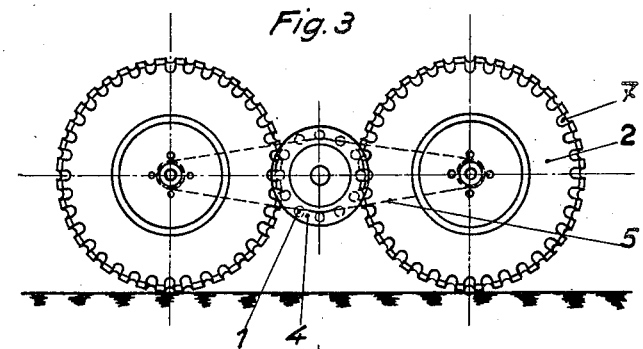
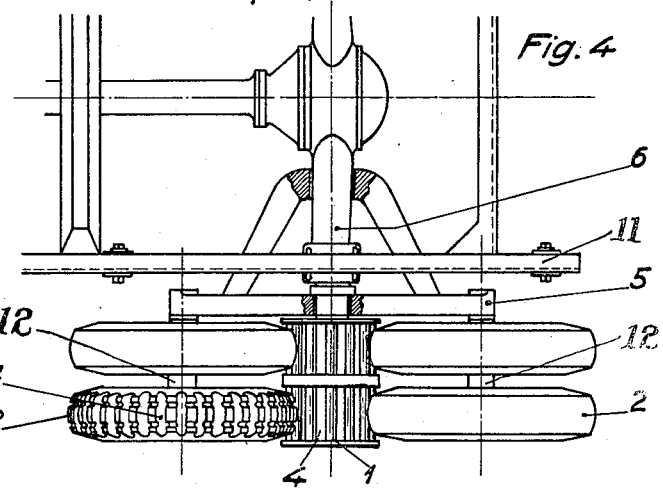
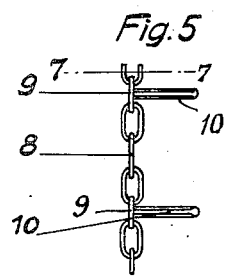
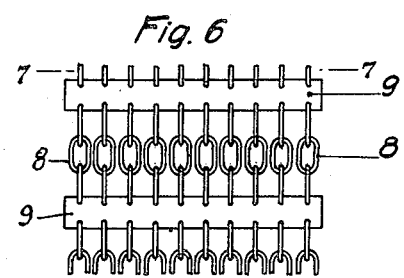
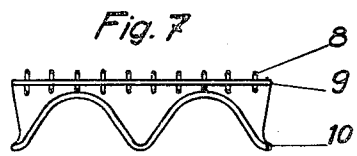
Inventor:
Hans Konrad Peter
by S. Lewal.
Attorney.

Patented July 26, 1938

2,124,708

UNITED STATES PATENT OFFICE 2,124,708

DRIVING DEVICE PROVIDED WITH ENDLESS TRACK CHAINS FOR MOTOR VEHICLES

Hans Konrad Peter, Liestal, Switzerland

Application March 4, 1935, Serial No. 9,169
In Switzerland March 5, 1934

2 Claims. (Cl. 180—9.1)

I have filed an application in Switzerland on March 5, 1934.

The present invention relates to driving devices provided with endless track chains for motor vehicles.

Travelling with motor vehicle in snow often involves great difficulty inasmuch as the running wheels of the vehicles sink into the snow and skid on account of the too small engagement and bearing surface.

The subject of the present invention is a resilient and noiseless-running driving device for motor vehicles which consists of a metallic toothed crown constructed as a hollow cylinder, which cylinder is arranged on the driving axle of the vehicle and the teeth of which cylinder engage with the toothed rubber tyres of the driving wheel which are arranged in known manner on the felloe of the wheel of the vehicle, so that the turning moment of the driving axle of the vehicle is transmitted to the rubber tyre of the driving wheel. Around the toothed rubber tyre the endless track chain is arranged.

In the accompanying drawings one constructional form according to the invention is illustrated by way of example. In the drawings:

Fig. 1 is a side view of a wheel aggregate provided with an endless track chain appertaining to the driving device, Fig. 2 is a plan of the latter partly in section, on line II—II of Fig. 1, Figs. 3 and 4 show a side view and plan respectively of the constructional details of one half of a four-wheel aggregate appertaining to the rear axle without the endless track chain, Fig. 5 is a side view of the chain linkage of the endless track chain, Fig. 6 is a plan of a part of an endless track chain, and Fig. 7 is a section through the chain linkage taken on line 7—7 of Figs. 5 and 6.

Referring to the drawings:

By means of the hollow metal toothed cylinder 1, the walls of which are perforated, and which is rigidly fixed on the driving axle 6 journalled in the vehicle body 11, the driving wheels 2 mounted on wheel axles 12 and provided with toothed rubber tyres are driven. The teeth of the cylinder 1 and the grooves 7 of the rubber tyre 2 engage with one another in such manner that thereby high contact pressure of the tyres on the cylinder is obtained and the extent of engagement of the teeth is increased. Through the openings 4 of the toothed cylinder 1 the masses of snow which in any case will be thrown on to the toothed cylinder 1 are pressed into the interior of the toothed cylinder whereupon they are again discharged by the rotation into the open air so that a uniform engagement of the toothed cylinder with the rubber tyre grooves 7 with freedom from clogging is ensured.

The bracket 5 in which the wheel axles 12 carrying the driving wheels 2 are journalled is mounted so as to be rotatable around the axle 6 of the vehicle so that both the rubber tyres on the left hand side and those on the right hand side of the vehicle can adapt themselves independently of one another to unevenness in the ground. According to the drawing the driving aggregate is provided with four such toothed rubber tyres, two arranged one behind the other on the right hand side of the vehicle and two arranged one behind the other on the left hand side of the vehicle. In order to increase the track bearing surface of the motor vehicle more than four toothed rubber tyres per aggregate may, however, be provided. Around the toothed rubber tyre aggregate the endless track chain 3 is laid which latter consists of several chain members 8 located adjacent to one another and forming a broad band, the said chain members being held together at short distances from one another by means of transverse ribs 9. The brackets 10 arranged on the inner side of the transverse ribs 9 guide the chain band and prevent lateral displacement or sliding-off from the toothed rubber tyre. The chain members are in the construction illustrated made up of loosely interconnected closed link members.

I claim:

1. A driving device provided with an endless track chain for motor vehicles, comprising in combination: a vehicle body; driving axles journalled in said vehicle body; hollow cylinders each mounted on one of said driving axles and each comprising spaced end walls and members forming teeth connecting said end walls at parts adjacent to their peripheries; brackets journalled on said driving axles; wheel axles journalled in said brackets; a plurality of driving wheels mounted on said wheel axles and arranged in such manner as to form two rows parallel to one another and each row comprising at least two driving wheels located one behind the other; toothed rubber tyres on the peripheries of said driving wheels; one of said hollow cylinders being arranged between each two driving wheels located one behind the other in such manner that its axis is in the same horizontal plane as the axis of said two driving wheels and that its teeth engage with the teeth of the latter so as to drive them; and an endless track chain comprising closed loosely interconnected links and transverse connecting ribs, said chain passing around said rubber tyres and engaging the teeth thereof to receive motion therefrom, substantially as described.

2. A driving device provided with an endless track chain for motor vehicles, comprising in combination: a vehicle body; driving axles journalled in said vehicle body; hollow cylinders, each mounted on one of said driving axles and each comprising two discs, and rod members located between said discs and connected to said discs adjacent to their peripheries, whereby said rods form teeth on said cylinders; brackets journalled on said driving axles; wheel axles journalled in said brackets; a plurality of driving wheels mounted on said wheel axles and arranged in such manner as to form two rows parallel to one another and each row comprising at least two driving wheels located one behind the other; toothed rubber tyres on the peripheries of said driving wheels; one of said hollow cylinders being arranged between each two driving wheels located one behind the other in such manner that its axis is in the same horizontal plane as the axes of said two driving wheels and that its teeth engage with the teeth of the latter, so as to drive them; an endless track chain comprising substantially elliptical closed loosely interconnected links, and ribs connecting some of said links transversely at spaced intervals, said endless track chain passing around said rubber tyres and engaging the teeth thereof to receive motion therefrom; and brackets arranged on the inner side of the transverse ribs of said endless track chain and co-operating therewith to prevent lateral displacement from said toothed rubber tyres, substantially as described.

HANS KONRAD PETER.